United States Patent [19]

Hartman et al.

[11] 4,441,954
[45] Apr. 10, 1984

[54] PHENOL-ALDEHYDE BENTONITE ADHESIVE COMPOSITION IN WOOD LAMINATION PROCESS

[75] Inventors: Seymour Hartman, Mahopac; Timothy M. Brown, Holmes, both of N.Y.

[73] Assignee: Champion International Corporation, Stamford, Conn.

[21] Appl. No.: 430,186

[22] Filed: Sep. 30, 1982

Related U.S. Application Data

[63] Continuation of Ser. No. 177,471, Aug. 12, 1980, abandoned.

[51] Int. Cl.³ ............................................... C09J 1/00
[52] U.S. Cl. ................................. 156/291; 156/335
[58] Field of Search ............... 156/335, 291; 528/120, 528/137; 524/447, 596

[56] References Cited

U.S. PATENT DOCUMENTS

| | | | |
|---|---|---|---|
| 2,612,481 | 9/1952 | Cone | 260/17.2 |
| 3,321,358 | 5/1967 | Campbell et al. | 156/235 |
| 3,637,547 | 1/1972 | Orth, Jr. | 260/17.2 |
| 3,990,928 | 11/1976 | Schmidtt-Hellerau | 260/17.3 |

Primary Examiner—Michael W. Ball
Attorney, Agent, or Firm—Evelyn M. Sommer

[57] ABSTRACT

Disclosed are a new adhesive and a process for making wood laminates with the adhesive. In a preferred embodiment, the adhesive will comprise a phenol-formaldehyde condensation product having a molar ratio of phenol to formaldehyde in the range of 1:1.5 to 1:2.5, a sodium hydroxide catalyst, and from 5 to 50% bentonite clay based upon the phenol-formaldehyde condensation product solids. The preferred process employs the new adhesive to prepare laminates using high moisture content veneers, such as southern pine. The laminates exhibit average percent wood failures of from 85 to 98%.

10 Claims, No Drawings

PHENOL-ALDEHYDE BENTONITE ADHESIVE COMPOSITION IN WOOD LAMINATION PROCESS

This is a continuation of application Ser. No. 177,471 filed Aug. 12, 1980 now abandoned.

BACKGROUND OF THE INVENTION

The present invention relates to a new adhesive and a process for making wood laminates employing the adhesive.

A wide variety of adhesives and processes are known for preparing wood laminates. Among the most widely used adhesives are various phenol-aldehyde condensation products. Typically, these adhesives are applied to wood plies and the plies are then subjected to a pressing operation to consolidate them into a unitary panel and cure the adhesive. In many situations it is desirable to perform the pressing in two or more stages to maximize the output from a fixed number of heated platen presses. Typically, a first pressing stage will be performed at ambient temperature under a pressure and for a time just sufficient to consolidate the separate plies into a unitary panel. A panel consolidated in this fashion can be stored and handled without shifting or separation of the plies. The consolidated panels are then typically cured under heat and pressure to form the final laminate.

The use of phenol-aldehyde adhesives is quite common in the production of wood laminates. In U.S. Pat. No. 3,637,547 to Orth, a colloidal, acicular magnesium aluminum silicate clay, such as attapulgite and sepiolite, is added to an otherwise conventional phenol-aldehyde adhesive. These particular clays are added in amounts of from 5 to 50% based on the weight of the phenol-aldehyde solids. In Example I of the above patent, panels prepared with an adhesive including 45% bentonite clay had a dry wood shear failure of 50% and a wet wood shear failure of 35%, as compared to values of 90-100% and 90-95% for identical samples prepared with attapulgus instead of bentonite.

It has generally been preferred in the past to prepare wood laminates from essentially dry wood plies because moist veneers invariably produce panel blows on opening the hot press after panel curing. Moreover, adhesives of the phenol-aldehyde type cure by condensation and are therefore inhibited to a certain extent by the presence of water. Recently, however, more attention has been given to the production of laminates using wood plies, such as southern pine veneers, having moisture contents of from 0 to 14% or higher based on the dry weight of the wood. The use of high moisture content plies is advantageous because conservation of energy due to reduced drying time and therefore more economical. Unfortunately, conventional adhesives do not perform satisfactorily in this environment, and usually prolonged pressing times are incurred and an undesirable number of laminates must be rejected due to panel blows.

SUMMARY OF THE INVENTION

It is an object of the present invention to provide a new adhesive composition.

It is another object of the present invention to provide a new adhesive composition suitable for making wood laminates.

It is another and more specific object of the present invention to provide a new adhesive composition especially suitable for making wood laminates from high moisture content plies.

It is another object of the present invention to provide an improved process for making wood laminates employing a new adhesive composition having excellent tackability.

It is yet another and more specific object of the present invention to provide an improved process for making wood laminates from high moisture content plies using a new adhesive composition.

These and other objects are achieved according to the present invention which provides a new adhesive composition and an improved process for making wood laminates. The new adhesive composition comprises: a phenol-aldehyde condensation product having a molar ratio of phenol to aldehyde in the range of 1:1.5 to 1:2.5, an alkaline catalyst selected from the group consisting of alkali metal and alkaline earth metal hydroxides; and from 5 to 50% of bentonite clay based on the weight of condensation product solids. The process comprises: (a) applying the new adhesive to mating surfaces of a plurality of wood plies in an amount of from 70 to 90 pounds per thousand square feet of double glue line; (b) assembling a panel of the plurality of wood plies by mating the surfaces to which the adhesive has been applied; (c) pressing the assembled plies under pressure for a time effective to create a bond of sufficient strength between them to hold them together in a unitary, consolidated panel; and (d) pressing the consolidated panel under conditions of pressure, temperature and time effective to cure the adhesive.

DETAILED DESCRIPTION OF THE INVENTION

The new adhesive composition of the present invention has a wide range of utilities, and can be employed for most of the same applications that phenol-aldehyde condensation product adhesives have been used in the past. Thus, they may be used not only in the production of wood laminates from dry and or high moisture content wood plies, but also for the manufacture of hardboard made of wood particles, molded articles containing fabric reinforcement, and a wide variety of other applications. Likewise, the process of the invention is not limited in utility to making wood laminates, from high moisture content wood plies, although this would be the preferred embodiment. For the purposes of conciseness, however, the following detailed description will be directed to the preferred embodiment of preparing a wood laminate from high moisture content plies and especially high moisture content wood veneers.

The preparation of wood laminates from high moisture content plies and veneers is becoming increasingly important due to the need to conserve energy whenever possible. Because wood plies used to make laminates typically have moisture contents of from 4 to 5%, based on the dry weight of the wood, a high moisture content wood is defined for the purposes of the present description as one with a moisture content as greater than 5% and less than 19%. The usual and preferred range for moisture content will be from about 5 to about 14%. The term "ply" as used herein shall mean any one thin sheet of wood forming one or a part of one layer in a multi-layered, laminated wood product. The term "veneer" as used herein shall designate an exterior ply or portion thereof in a multi-layered, laminated wood product.

Typical of the varieties of wood which are readily available with high moisture content are: soft woods such as southern pine, Douglas fir and the like, and hard woods such as birch, walnut and the like.

The new adhesive compositions of this invention comprise a phenol-aldehyde condensation product, a suitable alkaline catalyst and from 5 to 50%, based on the weight of the condensation product solids, of bentonite clay. Preferably, the bentonite clay will be employed in an amount of from 20 to 35%. Bentonite clay is essentially sodium montmorillonite. It is derived from the Pacific Coast states, swells when wetted, and has strong absorbing properties. One suitable form of commercially available bentonite clay is sold by Georgia Kaolin Company under the trademark Bentonite and Bentolite.

While hydroxybenzene-formaldehyde condensation product is most often used as the phenol-aldehyde adhesive, other aldehydes and phenols generally used for adhesives may be employed. Illustrative of some of the aldehydes which may be used are the aliphatic aldehydes such as acetaldehyde and propionaldehyde; aromatic aldehydes, such as benzylaldehyde and furfural; and such other aldehydes as aldol, glyoxal, and crotonaldehyde. Illustrative of some of the phenols which may be employed in place of hydroxybenzene are resorcinol, cresol, pyrocatechol, cresylic acid, xylenols, naphthols, such as polyphenols such as the bis-hydroxyphenoly alkanes as 2,2'-bis-(4-hydroxyphenyl)propane. The molar ratio of phenol to aldehyde used can be varied from 1:1.5 to 1:2.5, preferably in the range of 1:1.8–1:2.0.

Also in the formation of the adhesive, other constituents usually employed in phenol-aldehyde adhesives used for wood laminations may be added to impart the beneficial characteristics normally obtained by the particular constituents, along with the bentonite clay being used as taught herein. Necessarily, an alkaline catalyst, preferably selected from the group consisting of alkali metal and alkaline earth metal hydroxides, is used to catalyze the condensation of the adhesive. Generally, the amount of the hydroxide used is in a molar ratio of hydroxide to phenol in the range of from 0.4:1 to 0.9:1. Preferably, at least one filler selected from the group consisting of starch, wood flour, nutshell flour, bark products or agriculture residues, and wheat flour is employed in the adhesive in amounts of from 1 to 10 weight percent of the resin solids.

According to the process, the new adhesive of the invention is applied to the mating surfaces of a plurality of wood plies. The surfaces which will be on the exterior of the panel are preferably not coated.

The adhesive is applied to the plies generally in amounts from 70 to 90 pounds, preferably from 70 to 80 pounds, per thousand square feet of double glue line. After assembly, the panel is subjected, at ambient temperature, typically being from 15° to 30° C., to a pressure sufficient to bring the plies into contact with each other to consolidate the plies. Generally, a pressure in the range of 150 to 200 pounds per square inch is used. The plies are subjected to the pressure until a sufficient initial or pre-press bond is obtained to keep the plies from separating or coming apart upon the release of the pressure. A bond of the required strength is usually obtained in a contact time in the range of 0.5 to 5 minutes, although in a particular type of panel construction a satisfactory bond may be obtained in the time required to attain contact pressure or the pressure necessary to bring the plies into contact with each other.

Consolidation of the panels by pre-pressing permits the panels to be handled much more easily and quickly than one stage procedures and therefore allows a greater extent of automation. Also, the number of platens loaded in the hot press can be increased, since the panels are near to the final thickness. Less curling or fold back of the outer plies is also obtained, thus decreasing the number of rejects. In hot pressing, the panels may be subjected to the pressures and temperatures normally employed for heat setting of the particular phenol-aldehyde adhesive. Pressures of from 50 to 500 pounds per square inch at temperatures in the range of 90° to 200° C. are often used. The panels are subjected to the pressing for a sufficient time to bring the panels up to the curing temperature of the adhesive which, for the normal type of panel construction, may usually require 1 to 20 minutes.

A feature of the present invention is that the wood laminates made with the new adhesive exhibit vacuum pressure and boil shear test strength greater than would be expected for a bentonite-containing phenol-aldehyde adhesive, and superior to results which have heretofore been achieved with any phenol-aldehyde adhesive system for wood laminates made from high moisture content plies. The adhesive prepared with bentonite has excellent tackability. The vacuum pressure and boiling shear tests are standard methods for objectively rating the adhesive bonds of a wood laminate. These shear value tests are conducted by the test procedures described in U.S. Product Standard PSI-74 (Aug. 1, 1974)—Section 4.5.2 for Vacuum Pressure Test and 4.5.3 for Boiling Test. Thus, V/P shear % wood failure scores are expressed in percentages; and, in the example, a score of 95% means that the broken area of the shear sample contains 95% wood fibers. A one inch square sample after shear testing contains 95% wood fibers and 5% fiber free area. In other words, the average wood failure of all test specimens is not less than 95%. Similarly, the boiling shear % wood failure score is determined in the same manner.

The following examples are presented for the purpose of further illustrating and explaining the present invention and are not to be taken as limiting in any regard. Unless otherwise indicated, all parts and percentages are by weight.

EXAMPLE I

This example illustrates the preparation of a wood laminate employing high moisture content plies including a high moisture content veneer of southern pine.

The following formula was prepared:
Resin—912 parts
Water—200
Bentolite—100
Glu X—50
Co Cob—50
(50%) Caustic—50
and applied to the both faces of the 2nd and 4th plies of a five ply panel construction, at a spread rate of 85 lbs./MDGL Co-cab is a furfural digestion residue made from corn cobs and used as a filler. After the desired assembly time of from 10–40 minutes had elapsed, the panels were cold pressed for 3½ minutes, at a pressure of 175 psi. This was followed by placing the panels in a hot press at a temperature of 300° F., under a pressure of 180–200 psi for 7 minutes.

Two sets of plywood (Southern pine) 5 ply panels were prepared using 5% Moisture Content Veneers and 11% Moisture Content Veneers, respectively.

The Average Shear values for the above prepared panels were as follows:

| 5% Moisture Content Veneers | |
|---|---|
| Vacuum pressure | 226 psi |
| | 90% wood failure |
| Boil testing | 198 psi |
| | 91% wood failure |
| 11% Moisture Content Veneers | |
| Vacuum pressure | 232 psi |
| | 88% wood failure |
| Boil testing | 187 |
| | 85% wood failure |

When the control glue Formula was prepared (same as in Example, but using no bentolite i.e., as follows:
Resin—912 parts
Water—200
Co-cob—150
glu X—50
(50%) Caustic—50
and was used with the same moisture content veneers as shown above.

The average shear values for these panels were as follows:

| 5% Moisture Content Veneers: | |
|---|---|
| Vacuum pressure | 240 psi |
| | 91% Wood failure |
| Boil testing | 203 psi |
| | 92% wood failure |

All of the 11% Moisture Content Veneers produced panel blows. As the bentolite was incresed to 150 parts or reduced to 50 parts with the co-cob decreased or increased in the above formula. The average shear value results of the prepared panels using the two different percent Moisture Content Veneers, namely 5% MC and 11% MC showed similar results for the 5% Moisture Content veneers, but lower average shear values for the 11% Moisture Content Veneers. The average % wood failure for the 11% Moisture Content Veneer panel was 63 percent.

The above description is presented for the purpose of enabling those people skilled in the art to make and use the present invention, and it is not intended to detail all those obvious modifications and variations which will become apparent upon reading. It is intended, however, that all those obvious modifications and variations be included within the present invention, the scope of which is defined by the following claims.

What is claimed is:

1. A process for making wood laminates from a plurality of wood plies which comprises:
   (a) applying an adhesive to mating surfaces of a plurality of wood plies in an amount of from 70 to 90 pounds per thousand square feet of double glue line, the adhesive consisting essentially of a condensation product of a phenol and an aldehyde having a molar ratio of phenol to aldehyde in the range of 1:1.5 to 1:2.5, an alkaline catalyst selected from the group consisting of alkali metal and alkaline earth metal hydroxides, from 20% to 35% of bentonite clay based on the weight of condensation product solids;
   (b) assembling a panel of the plurality of wood plies by mating the surfaces to which the adhesive has been applied;
   (c) pressing the assembled plies under pressure for a time effective to create a bond of sufficient strength between them to hold them together in a unitary, consolidated panel; and
   (d) pressing the consolidated panel under conditions of pressure, temperature and time effective to cure the adhesive.

2. A process according to claim 1 wherein the condensation product is a hydroxybenzene-formaldehyde condensation product.

3. A process according to claim 1 wherein the ratio of phenol to aldehyde in the adhesive is in the range of 1:1.8 to 1:2.

4. A process according to claim 1 wherein the catalyst is an alkali metal hydroxide present in a molar ratio of hydroxide to hydroxybenzene in the range of 0.4:1 to 0.9:1.

5. A process according to claim 4 wherein the catalyst is sodium hydroxide.

6. A process according to claim 1 wherein the adhesive further comprises from 5% to 50% of at least one filler selected from the group consisting of wood flour, nutshell flour, bark products, agricultural residues, and combinations of these, the percentage being based on the weight of condensation product solids.

7. A process according to claim 1 wherein the pressing of step (d) is carried out at a temperature of from 90° to 200° C., under a pressure of from 50 to 500 pounds per square inch, for a time period of from 1 to 20 minutes.

8. A process according to claim 1 wherein at least one wood ply has a moisture content of from 5% to 19% based on the dry weight of the ply.

9. A process according to claim 8 wherein the said one wood ply is southern pine.

10. A process according to claim 9 wherein the said one wood ply is a veneer.

* * * * *